United States Patent [19]

Bedard et al.

[11] Patent Number: 5,830,427
[45] Date of Patent: Nov. 3, 1998

[54] METALLOCHALCOGENIDE MICROPOROUS COMPOSITIONS HAVING METAL-METAL BONDS

[75] Inventors: Robert L. Bedard, McHenry; Robert W. Broach, Grayslake, both of Ill.; Andrzej Malek, Turnersville, N.J.; Geoffrey A. Ozin; David Young, both of Toronto, Canada

[73] Assignee: UOP LLC, Des Plaines, Ill.

[21] Appl. No.: 687,867

[22] Filed: Jul. 26, 1996

Related U.S. Application Data

[60] Provisional application No. 60/002,573 Aug. 21, 1995.

[51] Int. Cl.$^6$ .............................. C01B 17/46; C01B 19/00
[52] U.S. Cl. .......................... 423/701; 423/702; 423/704; 423/713; 423/502; 423/517; 423/518; 502/215; 502/216; 502/222
[58] Field of Search ...................... 423/701, 702, 423/704, 713, 508, 511, 517, 518; 502/215, 216, 222, 330, 331, 344, 347, 349, 352

[56] References Cited

U.S. PATENT DOCUMENTS

| | | | |
|---|---|---|---|
| 4,061,724 | 12/1977 | Grose et al. | 423/335 |
| 4,310,440 | 1/1982 | Wilson et al. | 252/435 |
| 4,440,871 | 4/1984 | Lok et al. | 502/214 |
| 4,500,651 | 2/1985 | Lok et al. | 502/208 |
| 4,880,761 | 11/1989 | Bedard et al. | 502/215 |
| 4,956,164 | 9/1990 | Lok et al. | 423/704 |
| 4,992,250 | 2/1991 | Flanigen et al. | 423/713 |
| 5,122,357 | 6/1992 | Bedard et al. | 423/518 |
| 5,354,719 | 10/1994 | Gabelica et al. | 502/63 |
| 5,397,561 | 3/1995 | Smith | 423/704 |
| 5,518,707 | 5/1996 | Bedard et al. | 423/700 |
| 5,531,936 | 7/1996 | Kanatzidis et al. | 423/508 |
| 5,618,471 | 4/1997 | Kanatzidis et al. | 423/508 |

OTHER PUBLICATIONS

V.S. Pohl and B. Krebs, Z. anorg. allg. Chem. 424, (1976), pp. 265–272 No month.

M. Ribes, J. Oliver–Fourcade, E. Philippot, and M. Maurin, J. Solid State Chem. 8, (1973), pp. 195–205. No month.

O.M. Yaghi, Z. Sun, D.A. Richardson, and T.L. Groy, J. Am. Chem. Soc., 116, (1994), pp. 807–808. No month.

M. Jansen, Angew. Chem. Int. Ed. Engl., 26, (1987), pp. 1098–1110 No month.

*Primary Examiner*—Mark L. Bell
*Assistant Examiner*—David Sample
*Attorney, Agent, or Firm*—Thomas K. McBride; Frank S. Molinaro

[57] ABSTRACT

This invention relates to dimetal sulfide or selenide microporous crystalline compositions. These compositions have the empirical formula $$R_x(M^{1+}{}_yM^{2+}{}_zM_4)A_q$$

where R is a cation such as tetramethylammonium ion, $M^{1+}$ is a metal such as copper, silver, etc. $M^{2+}$ is a metal such as zinc, cobalt, etc., M is germanium or tin and A is sulfur or selenium. The subscripts x, y, z and q represent the mole fractions of R, $M^{1+}$, $M^{2+}$ and A respectively. Finally, the three dimensional structure of said composition is characterized in that it contains $M^{1+}$—$M^{1+}$ metal-metal bonds.

10 Claims, No Drawings

METALLOCHALCOGENIDE MICROPOROUS COMPOSITIONS HAVING METAL-METAL BONDS

CROSS REFERENCE TO RELATED APPLICATION

This application claims the benefit of U.S. Provisional application No. 60/002573, filed on Aug. 21, 1995.

FIELD OF THE INVENTION

This invention relates to novel microporous crystalline compositions having a three-dimensional framework structure and characterized in that the structure contains metal-metal bonds.

BACKGROUND OF THE INVENTION

Molecular sieves of the crystalline aluminosilicate zeolite type are well known in the art and now comprise over 150 species of both naturally occurring and synthetic compositions. In general, the crystalline zeolites are formed from corner-sharing $AlO_2$ and $SiO_2$ tetrahedra and are characterized by having pore openings of uniform dimensions, having a significant ion-exchange capacity and being capable of reversible desorbing an adsorbed phase which is dispersed throughout the internal voids of the crystal without significantly displacing any atoms which make up the permanent crystal structure.

Other crystalline microporous compositions are known which are not zeolitic but which exhibit the ion-exchange and/or adsorption characteristics of the zeolites. These include: 1) a pure silica polymorph, silicalite, having a neutral framework containing neither cations nor cation sites as disclosed in U.S. Pat. No. 4,061,724; 2) crystalline aluminophosphate compositions disclosed in U.S. Pat. No. 4,310,440; 3) silicon substituted aluminophosphates as disclosed in U.S. Pat. No. 4,440,871, and 4) titanium substituted aluminophosphates as disclosed in U.S. Pat. No. 4,500,651.

In addition to molecular sieves based on the oxide of the metals, the art has also reported on molecular sieves based on metal sulfide or selenide. For example, U.S. Pat. No. 4,880,761 discloses germanium or tin sulfide or selenide molecular sieves as well as metallogermanate or metallotin sulfide or selenide molecular sieves. Metal oxysulfide materials are disclosed in U.S. Pat. No. 5,122,357.

In contrast to this art, applicants have synthesized a new group of metal sulfide/selenide microporous compositions in which the structure contains metal-metal bonds. These dimetal compositions are represented by the empirical formula $$R_x(M^{1+}{}_yM^{2+}{}_zM_4)A_q$$

where R is a cation, M is germanium, tin or mixtures thereof, $M^{1+}$ is a metal such as silver, copper, etc., $M^{2+}$ is a metal such as zinc, cobalt, manganese, etc., and A is sulfur or selenium. The metal-metal bond is formed between the $M^{1+}$ metals.

SUMMARY OF THE INVENTION

As stated, the present invention relates to novel microporous compositions. Accordingly, one embodiment of the invention is a crystalline composition having a three-dimensional microporous framework structure, an intracrystalline pore system and an empirical formula of:

$$R_x(M^{1+}{}_yM^{2+}{}_zM_4)A_q$$

where R is a cation selected from the group consisting of tetramethylammonium, trimethylaminium, dimethylaminium, methylaminium, ethylaminium, alkali and alkaline earth metal cations, x varies from 0 to less than 2, M is germanium, tin or mixtures thereof, $M^{1+}$ is a metal selected from copper, silver, gold, and mercury, y has a value of greater than 0 to about 4, $M^{2+}$ is a metal selected from the group consisting of cobalt, zinc, manganese, iron, nickel, copper, and mercury, z has a value from zero to less than 1, A is sulfur or selenium, q has a value from about 9 to about 10, (y+z+4)/q>0.56 and characterized in that the structure of said composition contains $M^{1+}$—$M^{1+}$ metal-metal bonds.

Another embodiment of the invention is a process for preparing a crystalline composition having a three-dimensional microporous framework structure, an intracrystalline pore system and an empirical formula of:

$$R_x(M^{1+}{}_yM^{2+}{}_zM_4)A_q$$

where R is a cation selected from the group consisting of tetramethylammonium, trimethylaminium, dimethylaminium, methylaminium, ethylaminium, alkali and alkaline earth metal cations, x varies from 0 to less than 2, M is germanium, tin, or mixtures thereof, $M^{1+}$ is a metal selected from copper, silver, gold, and mercury, y has a value of greater than 0 to about 4, $M^{2+}$ is a metal selected from the group consisting of cobalt, zinc, manganese, iron, nickel, copper, and mercury, z has a value from zero to less than 1, A is sulfur or selenium, q has a value from about 9 to about 10, (y+z+4)/q>0.56 and characterized in that the structure of said composition contains $M^{1+}$—$M^{1+}$ metal-metal bonds, the process comprising mixing a solution containing a soluble salt of a $M_4A_{10}{}^{4-}$ adamantane anionic species having an empirical formula of $R_4M_4A_{10}$:$tH_2O$ where t has a value of 0 to about 10 with a solution containing a compound of a $M^{1+}$ metal and optionally a compound of a $M^{2+}$ metal, reacting the resulting mixture for a time and at a temperature to produce said composition, and recovering said composition.

These and other objects and embodiments will become more apparent after a more detailed description of the invention.

DETAILED DESCRIPTION OF THE INVENTION

The crystalline dimetal compositions of the instant invention have the composition represented by the empirical formula $$R_x(M^{1+}{}_yM^{2+}{}_zM_4)A_q \quad (I)$$

where R is a cation selected from the group consisting of tetramethylammonium, trimethylaminium, dimethylaminium, methylaminium, ethylaminium, and alkali and alkaline earth metal cations, "x" varies from 0 to less than 2, M is germanium, tin or mixtures thereof, $M^{1+}$ is a metal selected from the group consisting of copper, silver, gold, and mercury, "y" has a value of greater than 0 to about 4, $M^{2+}$ is a metal selected from the group consisting of cobalt, zinc, manganese, iron, nickel, copper and mercury, "z" has a value from 0 to less than 1, A is sulfur or selenium, "q" has a value from about 9 to about 10 and (y+z+4)q>0.56.

When z=0, there are no +2 metals in the framework and the composition is prepared by reacting a solution containing a salt of a $M_4A_{10}{}^{4-}$ adamantane anionic species with a solution containing a $M^{1+}$ metal salt. The preparation of the adamantane $M_4A_{10}^{4-}$ anionic species, as well as their crystallographic and spectroscopic characterizations in the solid state and in solution, have been described in the art: V. S. Pohl and B. Krebs, Z. *Anorg. Allg. Chem.* 424, (1976), pp. 265–272; M. Ribes, J. Oliver-Fourcade, E. Philippot, and M. Maurin, *J. Solid State Chem.* 8, (1973), pp. 195–205, O. M. Yaghi, Z. Sun, D. A. Richardson, and T. L. Groy, *J. Am. Chem. Soc.*, 116, (1994), pp. 807–808, all of which are incorporated by reference.

The salt of the $M_4A_{10}^{4-}$ adamantane anionic species has the empirical formula $$R_4M_4A_{10}:tH_2O$$

where "t" has a value of 0 to about 10. The adamantane-thio/seleno metallate is prepared by combining germanium, tin or a mixture thereof, sulfur, selenium or a mixture thereof, an R cation salt, and water to give a reaction mixture with the composition $$v(R)X:M:2.5A:wH_2O$$

where "v" has a value of about 1 to about 10 and "w" has a value from about 10 to about 1000. The R cations which can be used are tetramethylammonium ion $((CH_3)_4N^+)$, trimethylaminium ion $((CH_3)_3N^+H)$, dimethylaminium ion $((CH_3)_2N^+H_2)$, methylaminium ion $((CH_3)N^+H_3)$, alkali and alkaline earth metal ions. The alkali metal ions include lithium, sodium, rubidium, cesium and potassium ions, while the alkaline earth metal ions include but are not limited to calcium, strontium and barium ions. The counter ions (X), i.e., anions, associated with the R cation include but are not limited to halides, especially bromide and chloride, hydroxide, acetate and oxalate.

The mixture is sealed in an inert reaction vessel and heated at temperatures of about 25° C. to about 200° C. for 1 to about 48 hours. The mixture is cooled and any trace amounts of unreacted solids are filtered to give a clear solution. To this solution a polar solvent is added to precipitate the adamantane-thio/seleno metallate salt. Illustrative of these polar compounds are ethanol, acetonitrile, acetone, methanol and dimethylformamide.

A solution of the adamantane anionic species is prepared by dissolving the desired amount of the adamantane-thio/seleno metallate salt described above in water. The adamantane anionic solution is mixed with an aqueous solution of a $M^{1+}$ metal salt. Illustrative of the $M^{1+}$ metal salts which can be used are copper acetate, silver acetate, gold(I) acetate, mercury acetate, copper chloride, gold(I) chloride, mercury chloride, silver nitrate, copper nitrate and gold nitrate. The mixture of solutions will contain the $M_4A_{10}^{4-}$ adamantane anionic species and the $M^{1+}$ salt in a molar ratio of about 1:0.1 to 1:4. Finally, the mixture is reacted at a temperature of about 0° C. to about 200° C. for a time of about 0.1 to about 1000 hr to provide the crystalline dimetal compositions of this invention.

The dimetal compositions of this invention can optionally contain a $M^{2+}$ in the framework, i.e., "z" is greater than 0 in empirical formula (I). In this case, the process involves reacting a metal salt solution containing both $M^{1+}$ and $M^{2+}$ cations with a solution containing the salt of the $M_4A_{10}^{4-}$ adamantane anionic species described above such that the ratio of moles of $M^{1+}:M^{2+}$ is proportional to the desired ratio of $M^{1+}$ to $M^{2+}$ in the dimetal composition.

As stated, the $M^{2+}$ metal is selected from the group consisting of cobalt, zinc, manganese, iron, nickel, copper and mercury. Illustrative of the compounds which can be used in the above reaction mixture include cobalt acetate, zinc acetate, manganese acetate, iron acetate, nickel acetate, copper acetate, mercury acetate, cobalt chloride, zinc chloride, manganese chloride, iron chloride, nickel chloride, copper chloride and mercury chloride.

The resultant crystalline microporous dimetal compositions of this invention are characterized in that the framework contains $M^{1+}$—$M^{1+}$ metal-metal bonds. These types of metal-metal bonds are found in many dense phase inorganic solids and have been extensively reported in the literature, See, M. Jansen, Angew. Chem. Int. Ed. Engl., 26, (1987), pp. 1098–1110 and references contained therein. The metal-metal bonds in the compositions of the subject invention have been characterized by synchrotron and sealed tube powder X-ray crystallographic studies and are within a range of bonding distances comparable to the $M^{1+}$—$M^{1+}$ bonds in the metallic or alloy forms of the metal as well as the bond distances outlined in the above literature.

The resultant dimetal composition can be heated, with or without vacuum, to remove decomposable cations, i.e., alkylammonium cations. Generally, the composition is heated at a temperature of about 50° C. to about 300° C. for a time of about 2 hours to about 24 hours. Additionally, the R cation can be ion exchanged (partially or completely) with mono or divalent cations by means well known in the art.

The following examples are set forth in order to more fully illustrate the invention. It is to be understood that the examples are only by way of illustration and are not intended as an undue limitation on the broad scope of the invention as set forth in the appended claims.

EXAMPLE 1

TMA adamantane-thiogermanate was prepared by combining in a 45 mL Teflon® liner 4.05 g of germanium powder (Aldrich), 4.47 sublimed sulfur (Aldrich), 12.63 g tetramethylammonium (TMA) hydroxide pentahydrate (Aldrich) and 10.04 g of deionized water to give a reaction mixture with the composition $$1.25\ ((CH_3)_4N)OH:Ge:2.5S:25H_2O$$

The liner was capped, sealed into a stainless steel bomb and tumbled at 150° C. for 16 hours. The mixture was cooled and trace amounts of unreacted solids were filtered to give a deep yellow solution. Absolute ethyl alcohol was added to this solution and a product was precipitated that was shown by x-ray powder and single crystal diffraction studies to have the composition and structure of $((CH_3)_4N)_4Ge_4S_{10}$. This sample was identified as sample A.

EXAMPLE 2

Two solutions were prepared. One solution was prepared by dissolving 0.04 g of silver nitrate (0.22 mmol) in 2.00 g of deionized water. A second solution was prepared by dissolving 0.2 g of sample A in 2.00 g of deionized water. The silver nitrate solution was added to the sample A solution and the mixture was heated to 70° C. for 24 hours. A product identified as $TMA_2Ag_2Ge_4S_{10}$ was obtained. The chemical composition as determined by the refined x-ray crystal structure matched the chemical composition derived from elemental analysis. Subsequent solution of the structure from Synchrotron x-ray powder diffraction data and difference electron density maps revealed that $Ag_2S_4$ units were present. Each Ag ion is linearly bonded to two of the sulfide species; and in turn these linear S—Ag—S units are bonded through their Ag ions such that the two S—Ag—S vectors are perpendicular. The $Ag^{1+}$—$Ag^{1+}$ bond length calculated in this material is 2.78 Å, while the bond length observed in metallic Ag is 2.89 Å. The composition displays a combined metal to sulfide ratio of 0.6.

EXAMPLE 3

A copper solution was prepared by dissolving 0.23 g of sodium bromide in a mixture of 1.00 g deionized water and 1.00 g of acetonitrile followed by addition of 0.04 g of cuprous chloride. Next a solution of sample A was prepared by dissolving 0.20 g of sample A in a mixture of 0.8 g deionized water and 1.00 g of acetonitrile. The solution of sample A was added to the copper solution and the mixture reacted at 25° C. for 16 hours to give a white product which was identified as $TMA_2Cu_2Ge_4S_{10}$. The chemical composition was determined from the refined x-ray crystal structure. X-ray diffraction data were obtained from copper K-alpha radiation by use of computer based techniques using a Siemens D-5000 high resolution X-powder diffractometer fitted with a Kevex solid state detector. Using the Ge and S atomic coordinates from the structure determination of the composition in Example 2 as a starting model, electron density difference maps were calculated. These calculations revealed the presence of $Cu^{1+}$—$Cu^{1+}$ bonded $Cu_2S_4$ units in the structure that are substantially similar to the $Ag_2S_4$ units of the composition of Example 2. The $Cu^{1+}$—$Cu^{1+}$ bond length calculated for this composition is 2.41 Å, while the bond length observed in metallic Cu is 2.54 Å.

We claim as our invention:

1. A crystalline composition having a three-dimensional microporous framework structure, an intracrystalline pore system and an empirical formula as follows:

$$R_x(M^{1+}_yM^{2+}_zM_4)A_q$$

where R is a cation selected from the group consisting of tetramethylammonium, trimethylaminium, dimethylaminium, methylaminium, ethylaminium, alkali and alkaline earth metal cations, x varies from 0 to less than 2, M is germanium, tin or mixtures thereof, $M^{1+}$ is a metal selected from copper, silver, gold, and mercury, y has a value of greater than 0 to about 4, $M^{2+}$ is a metal selected from the group consisting of cobalt, zinc, manganese, iron, nickel, copper, and mercury, z has a value from zero to less than 1, A is sulfur or selenium, q has a value from about 9 to about 10, (y+z+4)/q>0.56 and characterized in that the structure of said composition contains $M^{1+}$—$M^{1+}$ metal-metal bonds.

2. The composition of claim 1 where R is selected from the group consisting of tetramethylammonium, trimethylaminium, dimethylaminium, methylaminium and ethylaminium cation.

3. The composition of claim 1 where R is an alkali metal cation selected from the group consisting of lithium, sodium, potassium, cesium and rubidium cation.

4. The composition of claim 1 where R is an alkaline earth metal cation selected from the group consisting of barium, strontium and calcium.

5. A process for preparing a crystalline composition having a three-dimensional microporous framework structure, an intracrystalline pore system and an empirical formula of:

$$R_x(M^{1+}_yM^{2+}_zM_4)A_q$$

where R is a cation selected from the group consisting of tetramethylammonium, trimethylaminium, dimethylaminium, methylaminium, ethylaminium, alkali and alkaline earth metal cations, x varies from 0 to less than 2, M is germanium, tin, or mixtures thereof, $M^{1+}$ is a metal selected from copper, silver, gold, and mercury, y has a value of greater than 0 to about 4, $M^{2+}$ is a metal selected from the group consisting of cobalt, zinc, manganese, iron, nickel, copper, and mercury, z has a value from zero to less than 1, A is sulfur or selenium, q has a value from about 9 to about 10, (y+z+4)/q>0.56 and characterized in that the structure of said composition contains $M^{1+}$—$M^{1+}$ metal-metal bonds, the process comprising mixing a solution containing a soluble salt of a $M_4A_{10}^{4-}$ adamantane anionic species having an empirical formula of $R_4M_4A_{10}$:$tH_2O$, where t has a value of 0 to about 10 with a solution containing a compound of a $M^{1+}$ metal and optionally a compound of a $M^{2+}$ metal, reacting the resulting mixture for a time and at a temperature to produce said composition and recovering said composition.

6. The process of claim 5 where the mixture is reacted for a time of about 0.1 to about 1000 hours.

7. The process of claim 5 where the mixture is reacted at a temperature of about 0 to about 200° C.

8. The process of claim 5 where R is selected from the group consisting of tetramethylammonium, trimethylaminium, dimethylaminium, methylaminium and ethylaminium cation.

9. The process of claim 5 where R is an alkali metal cation selected from the group consisting of lithium, sodium, potassium, cesium and rubidium cation.

10. The process of claim 5 where R is an alkaline earth metal cation selected from the group consisting of barium, strontium and calcium.

* * * * *